(12) United States Patent
Dhillon et al.

(10) Patent No.: US 12,045,842 B2
(45) Date of Patent: Jul. 23, 2024

(54) SYSTEMS AND METHODS FOR ANALYZING MARKET RESEARCH DATA

(71) Applicant: Ipsos-Insight, LLC, New York, NY (US)

(72) Inventors: Jasjit S. Dhillon, Santa Barbara, CA (US); Rollo N. McIntyre, Wendover (GB); Alex Tamvakis, Glenview, IL (US)

(73) Assignee: Ipsos-Insight, LLC, New York, NY (US)

( * ) Notice: Subject to any disclaimer, the term of this patent is extended or adjusted under 35 U.S.C. 154(b) by 1382 days.

(21) Appl. No.: 15/439,089

(22) Filed: Feb. 22, 2017

(65) Prior Publication Data

US 2017/0243236 A1 Aug. 24, 2017

Related U.S. Application Data

(60) Provisional application No. 62/298,537, filed on Feb. 23, 2016.

(51) Int. Cl.
*G06Q 30/0201* (2023.01)

(52) U.S. Cl.
CPC ................ *G06Q 30/0201* (2013.01)

(58) Field of Classification Search
None
See application file for complete search history.

(56) References Cited

U.S. PATENT DOCUMENTS

| | | |
|---|---|---|
| 7,730,030 B1 | 6/2010 | Xu |
| 7,904,501 B1 | 3/2011 | Wei et al. |
| 8,239,455 B2 | 8/2012 | Wang |
| 8,843,831 B2 | 9/2014 | Brookhart |
| 9,195,753 B1 | 11/2015 | King et al. |
| 2003/0055659 A1 | 3/2003 | Alling |
| 2008/0228560 A1 | 9/2008 | Mack et al. |
| 2009/0018996 A1* | 1/2009 | Hunt ............ G06Q 30/02 |
| 2009/0265213 A1 | 10/2009 | Hyman et al. |
| 2009/0276708 A1* | 11/2009 | Smith ............ G06Q 10/10 715/700 |
| 2011/0004483 A1 | 1/2011 | Ting et al. |
| 2014/0157297 A1 | 6/2014 | Chao et al. |

(Continued)

FOREIGN PATENT DOCUMENTS

| | | | |
|---|---|---|---|
| AU | 2002334954 B2 * | 7/2008 | ......... G06Q 10/063 |
| WO | 2006020497 A2 | 2/2006 | |

OTHER PUBLICATIONS

Thomas Marrinan et al., SAGE2: A New Approach for Data Intensive Collaboration Using Scalable Resolution Shared Displays, 2014 10th IEEE International Conference on Collaborative Computing: Networking, Applications and Worksharing (Year: 2014).*

*Primary Examiner* — Jerry O'Connor
*Assistant Examiner* — Matthew H Divelbiss
(74) *Attorney, Agent, or Firm* — Armstrong Teasdale LLP

(57) ABSTRACT

A computer implemented method for analyzing market research data is provided. The method includes displaying, using a market research computing device, a live board to a plurality of users via respective user computing devices, wherein the live board includes at least one insight, receiving, at the market research computing device, an input from at least one user of the plurality of users, and updating, using the market research computing device, the live board in real-time based on the received input.

20 Claims, 12 Drawing Sheets

(56) References Cited

U.S. PATENT DOCUMENTS

| | | |
|---|---|---|
| 2014/0180788 A1 | 6/2014 | George et al. |
| 2015/0073821 A1 | 3/2015 | Ladd et al. |
| 2015/0193551 A1 | 7/2015 | Gordon et al. |
| 2015/0235045 A1 | 8/2015 | Schmitt et al. |
| 2015/0261883 A1 | 9/2015 | Wigodsky |
| 2015/0310188 A1* | 10/2015 | Ford .................... G06F 21/602 726/28 |
| 2016/0306806 A1* | 10/2016 | Fackler ............... G06F 3/04842 |

* cited by examiner

SYSTEMS AND METHODS FOR ANALYZING MARKET RESEARCH DATA

CROSS-REFERENCE TO RELATED APPLICATIONS

This application claims the benefit of priority to U.S. Provisional Patent Application No. 62/298,537, filed Feb. 23, 2016, entitled "SYSTEMS AND METHODS FOR ANALYZING MARKET RESEARCH DATA," the entire contents of which are hereby incorporated by reference in their entirety.

BACKGROUND OF THE DISCLOSURE

The field of the disclosure relates generally to analyzing market research data, and more particularly to a computer platform that enables real-time collaboration between a plurality of users.

In at least some known market research systems, research results are shared between users by using email and traditional electronic documents (e.g., .pdf files, .ppt files, etc.). Accordingly, to participate in a market research project, users generally have to transmit individual documents back and forth between each other, reducing efficiently and stifling collaboration.

There is a need, therefore, for a market research system that provides users with the ability to connect, rank, rate, and socially share research results in real-time in an effective and meaningful manner.

BRIEF DESCRIPTION OF THE DISCLOSURE

In one embodiment, a computer implemented method for analyzing market research data is provided. The method includes displaying, using a market research computing device, a live board to a plurality of users via respective user computing devices, wherein the live board includes at least one insight, receiving, at the market research computing device, an input from at least one user of the plurality of users, and updating, using the market research computing device, the live board in real-time based on the received input.

In another embodiment, a market research computing device is provided. The market research computing device includes a memory device, and a processor communicatively coupled to the memory device, the processor configured to cause a live board to be displayed to a plurality of users via respective user computing devices, wherein the live board includes at least one insight, receive an input from at least one user of the plurality of users, and update, using the market research computing device, the live board in real-time based on the received input.

In yet another embodiment, a non-transitory computer readable medium that includes computer executable instructions for analyzing market research data is provided. When executed by a market research computing device including a processor, the computer executable instructions cause the market research computing device to cause a live board to be displayed to a plurality of users via respective user computing devices, wherein the live board includes at least one insight, receive an input from at least one user of the plurality of users, and update, using the market research computing device, the live board in real-time based on the received input.

BRIEF DESCRIPTION OF THE DRAWINGS

FIG. 5 is a screenshot of one embodiment of a live board collaboration page that may be generated using the computer system shown in FIG. 1.

FIG. 6 is a screenshot of one embodiment of an insight landing page that may be generated using the computer system shown in FIG. 1.

FIG. 9 is a screenshot of one embodiment of a user dashboard page that may be generated using the computer system shown in FIG. 1.

FIG. 10 is a screenshot of one embodiment of an insight page that may be generated using the computer system shown in FIG. 1.

DETAILED DESCRIPTION OF THE DISCLOSURE

The embodiments described herein provide a computer system for facilitating collaboration and analysis of market research data. Using a market research computing device, a live board is displayed to a plurality of users via respective user computing devices. The live board includes at least one insight. An input from at least one user of the plurality of users is received at the market research computing device. The market research computing device then updates, in real-time the live board based on the received input.

Figure 1:
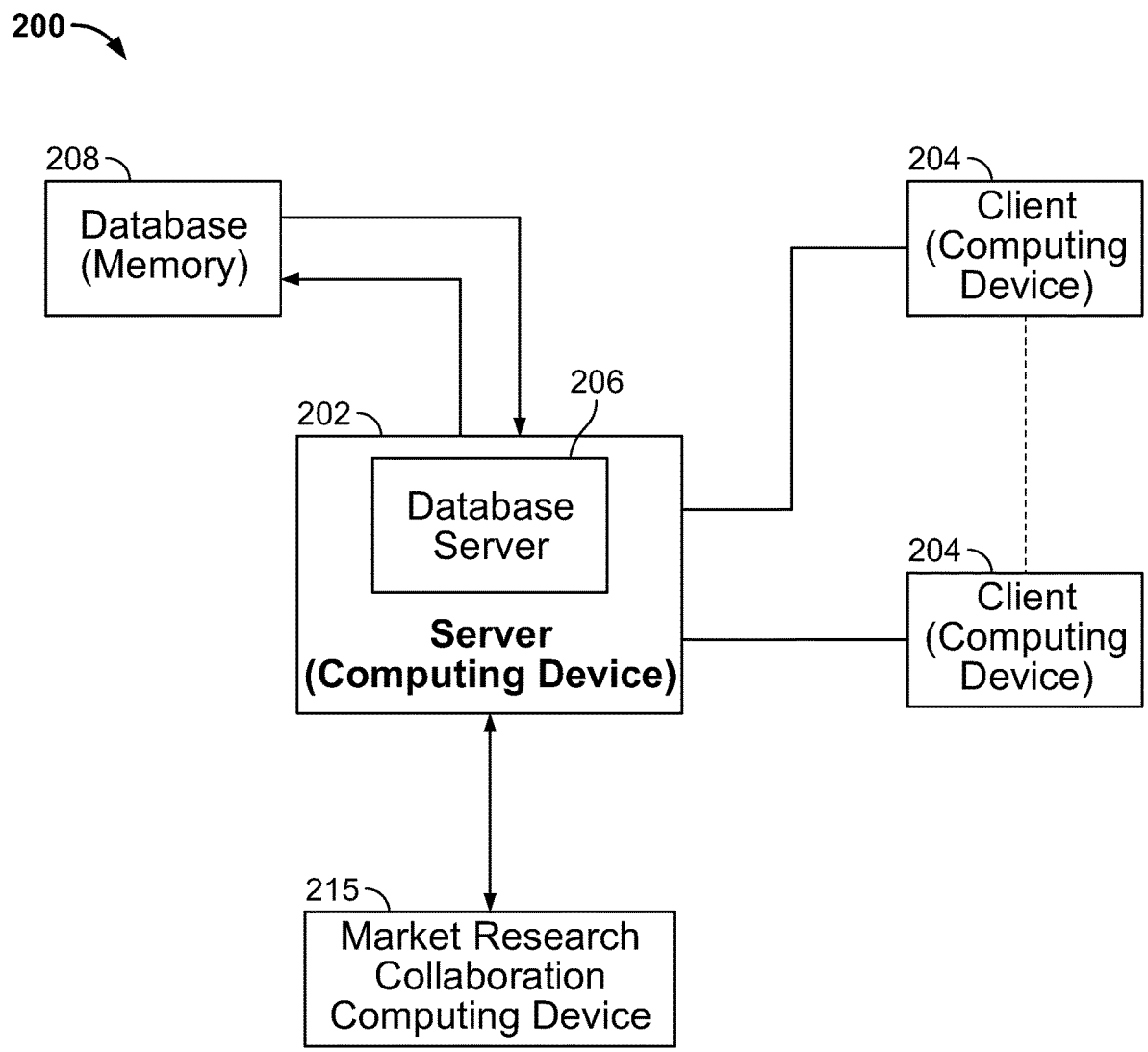
FIG. 1 is a simplified block diagram of one embodiment of a market research computer system.

FIG. 1 is a simplified block diagram of one embodiment of a market research computer system 200 that includes a market research collaboration computing device 215 in communication with a server system 202 that includes a database server 206. Further, a database 208 is in communication with server system 202. Market research collaboration computing device 215 includes a processing device and a memory. Computer system 200 further includes a plurality of client subsystems, also referred to as client systems 204 or client computing devices, connected to server system 202. In one embodiment, client systems 204 are computers including a web browser, such that server system 202 is accessible to client systems 204 using the Internet or another network. Client systems 204 are interconnected to the Internet or another network through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), watch, medical device, kiosk, laptop computer, desktop computer, netbook, tablet, phablet, or other web-connectable equipment.

Database server 206 is connected to database 208 containing information on a variety of matters, as described below in greater detail. In one embodiment, database 208 is stored on server system 202 and may be accessed by potential users at one of client systems 204 by logging onto server system 202 through one of client systems 204. Database 208 is also accessible to market research collaboration computing device 215. In an alternative embodiment, database 208 is stored remotely from server system 202 and may be non-centralized (e.g., in a cloud computing configuration). Server system 202 could be any type of computing device configured to perform the steps described herein. Additionally, market research collaboration computing device 215 is in communication with server system 202. In some implementations, market research collaboration computing device 215 is incorporated into or integrated within server system 202.

Figure 2:
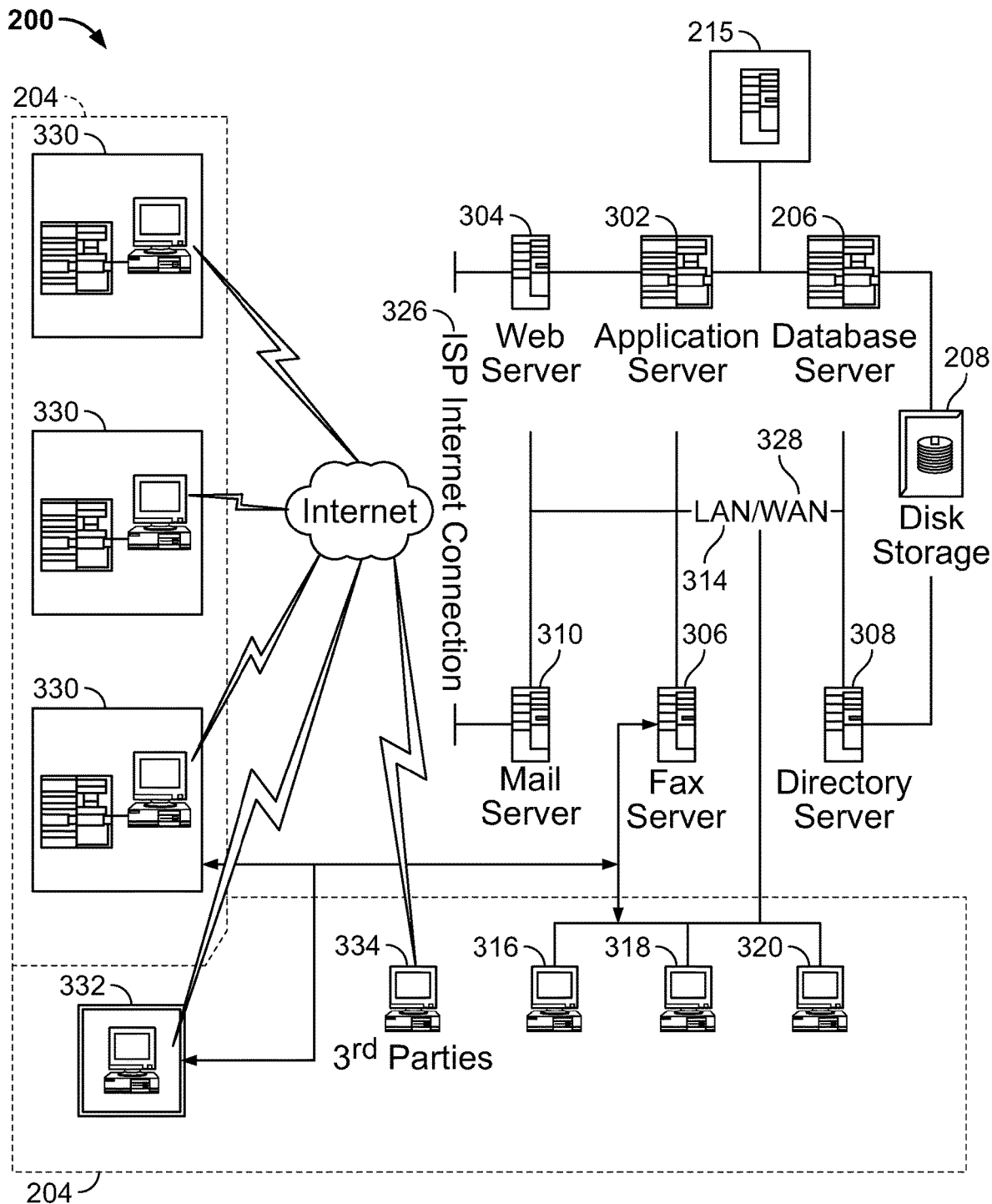
FIG. 2 is an expanded block diagram of a server architecture of the market research computer system shown in FIG. 1.

FIG. 2 is an expanded block diagram of a server architecture of market research computer system 200 in accordance with one embodiment. Computer system 200 includes client systems 204 and market research collaboration computing device 215. Server system 202 includes database server 206, an application server 302, a web server 304, a fax server 306, a directory server 308, and a mail server 310. Database 208 (e.g., a disk storage unit), is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Server system 202 is configured to be communicatively coupled to various entities, including third parties 334 using an Internet connection 326. Server system 202 is also communicatively coupled to market research collaboration computing device 215. In some embodiments, market research collaboration computing device 215 is integrated within server system 202. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with server system 202. Furthermore, fax server 306 communicates with remotely located client systems using a telephone link. Fax server 306 is configured to communicate with other client systems 316, 318, and 320 as well.

Figure 3:
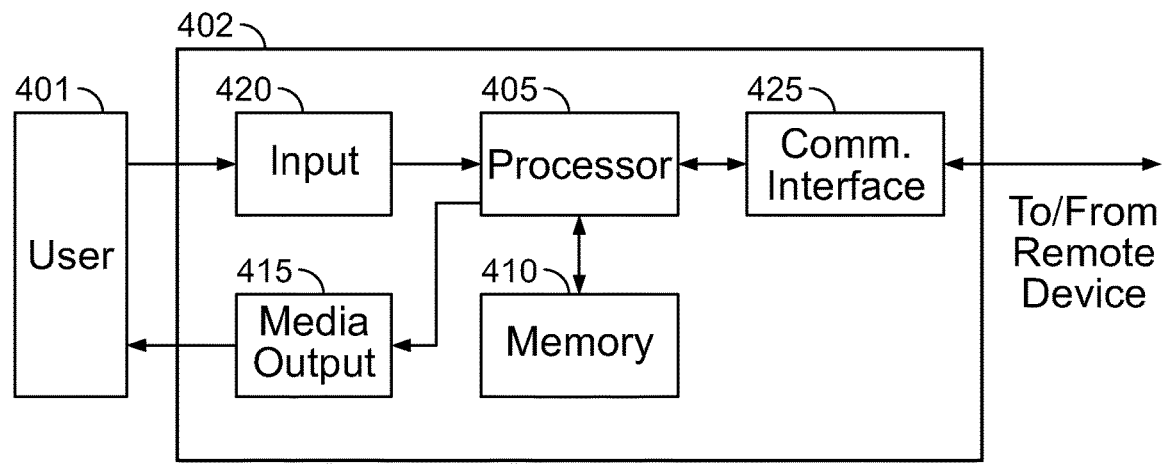
FIG. 3 illustrates an example configuration of a user computing device operated by a user.

FIG. 3 illustrates an example configuration of a user computing device 402 operated by a user 401. User computing device 402 may include, but is not limited to, client systems ("client computing devices") 204, 316, 318, and 320, workstation 330, and manager workstation 332 (shown in FIG. 2).

User computing device 402 includes one or more processors 405 for executing instructions. In some embodiments, executable instructions are stored one or more memory devices 410. Processor 405 may include one or more processing units (e.g., in a multi-core configuration). One or more memory devices 410 are any one or more devices allowing information such as executable instructions and/or other data to be stored and retrieved. One or more memory devices 410 may include one or more computer-readable media.

User computing device 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

User computing device 402 may also include a communication interface 425, which is communicatively connectable to a remote device such as server system 202. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 410 are, for example, computer-readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from server system 202. A client application allows user 401 to interact with a server application from server system 202 or a web server.

Figure 4:
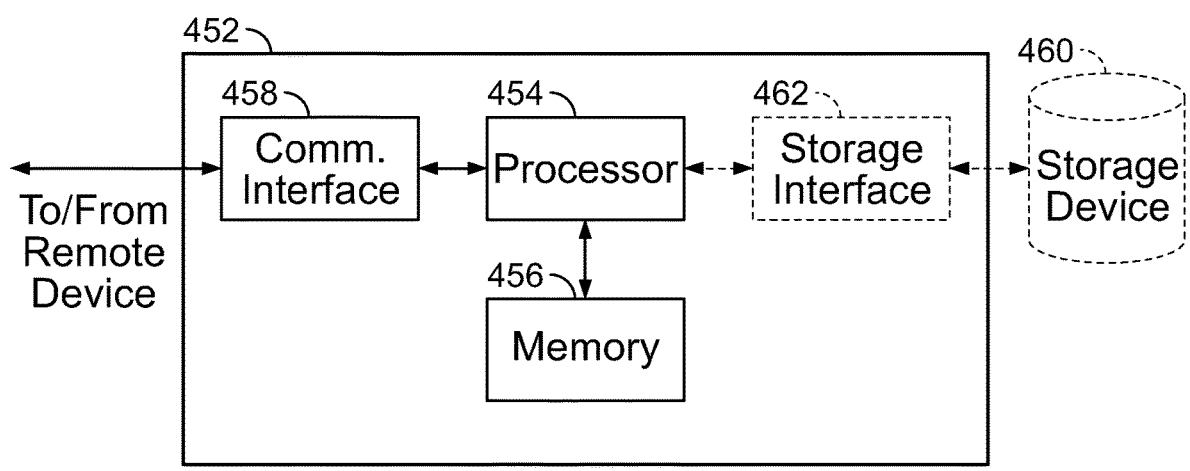
FIG. 4 illustrates an example configuration of a server computing device.

FIG. 4 illustrates an example configuration of a server computing device 452 such as server system 202 (shown in FIGS. 1 and 2). Server computing device 452 may include, but is not limited to, database server 206, application server 302, web server 304, fax server 306, directory server 308, and mail server 310. Server computing device 452 is also representative of agricultural analysis computing device 215.

Server computing device 452 includes one or more processors 454 for executing instructions. Instructions may be stored in one or more memory devices 456, for example. One or more processors 454 may include one or more processing units (e.g., in a multi-core configuration).

One or more processors 454 are operatively coupled to a communication interface 458 such that server computing device 452 is capable of communicating with a remote device such as user computing device 402 or another server computing device 452. For example, communication interface 458 may receive requests from client systems 204 via the Internet or another network, as illustrated in FIGS. 1 and 2.

One or more processors 454 may also be operatively coupled to one or more storage devices 460. One or more storage devices 460 are any computer-operated hardware suitable for storing and/or retrieving data. In some embodiments, one or more storage devices 460 are integrated in server computing device 452. For example, server computing device 452 may include one or more hard disk drives as one or more storage devices 460. In other embodiments, one or more storage devices 460 are external to server computing device 452 and may be accessed by a plurality of server computing devices 452. For example, one or more storage devices 460 may include multiple storage units such as hard disks or solid state disks in a redundant array of inexpensive disks (RAID) configuration. One or more storage devices 460 may include a storage area network (SAN) and/or a network attached storage (NAS) system. In some embodiments, one or more storage devices 460 may include database 208.

In some embodiments, one or more processors 454 are operatively coupled to one or more storage devices 460 via a storage interface 462. Storage interface 462 is any component capable of providing one or more processors 454 with access to one or more storage devices 460. Storage interface 462 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing one or more processors 454 with access to one or more storage devices 460.

One or more memory devices 410 and 456 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

As described herein, computer system 200 provides a distributed software platform that facilitates real-time collaboration between geographically distributed users. Users collaborate using a consistent data set of uniquely structured and curated qualitative market research information. Further, computer system 200 facilitates driving collaborative human insightfulness and inspiration using graph database structures and graph theory across behaviorally driven data sets. That is, graph technology is used to establish and display connections between market research results, along with meta-data. The collaboration is driven by social characteristics and non-quantitative values of importance, and takes advantage of machine learning algorithms, as described herein.

The distributed software platform (also referred to as the Insight Cloud Platform (ICP)) provided by computer system 200 is an online internet service that may be used by market research companies to connect, visualize, and socially rank and share quantitative and qualitative results of market research projects, including the associated meta-data and content. The platform may also be used by end-users to collaborate in real-time on selected insights or groups of insights for the purpose of knowledge sharing and discovery. The platform also facilitates tracking all marketing research results that a company might undertake over a predetermined period of time.

As used herein, an 'insight' is a targeted qualitative idea or concept that reveals a marketing related tension or aspiration, and that points towards a business opportunity. In contrast, 'observations' are facts, learnings, findings, trends, and/or internal performance measures. Observations are generally less targeted than insights, but still provide useful marketing intelligence. As described herein, computer system 200 enables users to collaborate in the generation and managing of insights and observations.

Computer system 200 uses live boards to facilitate real-time user collaboration, as described herein. Live boards provide the main access point to inspiration from human collaborators across curated market research data. More specifically, the live boards leverage a distributed hardware and software architecture with real-time extensions, or sockets, in order to allow seamless sharing of platform-based data across parties and across geographies.

Key data components in computer system 200 included a curated set of high quality insights. These insights are generated by subject matter experts across various related or disjointed markets, and are generated based on research data for such markets. In turn, these sets of curated insights are collaboratively leveraged by a wider set of industry experts that may include, for example, researchers, marketers, and thought leaders. This facilitates determining deeper relationships and supportive data to strengthen positions brought forth by the insights. The data is structured into a graph, as described herein. The graph facilitates evaluating and exposing strengths and weaknesses in relationships across these insights, markets, and supportive data sets.

The live boards in the embodiments described herein facilitate invitation-only collaboration. As used herein, invitation-only collaboration refers to a collaboration session in which the lead user (i.e., the user that initiated the live board) can selectively allow specific users of computer system 200 to have access to the activities ongoing in that specific live board (e.g., by sending invitations to those specific users). Further, the live boards facilitate sharing a single visual view across all collaborators, swapping control of a collaboration space to any member, and collaborating in real-time on curated insights. Using live boards, users can chat in real-time about the items being shared, include new media items and supportive data sets, and generate deeper connections (i.e., relationships) across other insights or data sets on the platform. Computer system 200 also leverages machine learning to assist discovery and collaboration, as described herein.

Figure 5:
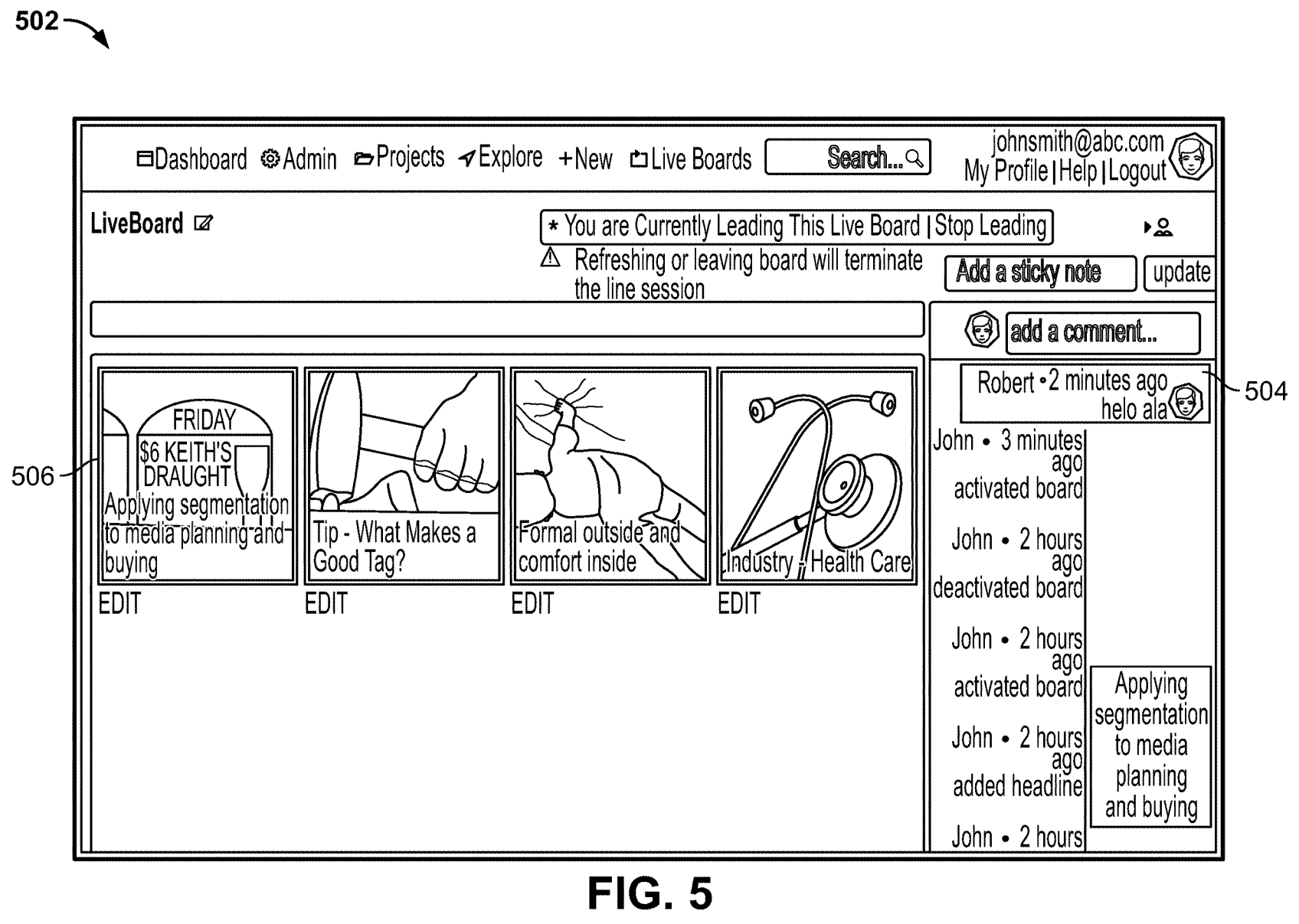

FIG. 5 is a screenshot of one embodiment of a live board collaboration page 502. Live board collaboration page 502 may be generated and displayed using computer system 200. As shown in FIG. 5, on live board collaboration page 502, participants may be invited to participate in a collaboration session. Further, participants may chat in real-time by inputting messages 504. Live board collaboration page 502 also includes a plurality of insights 506 for collaboration. Insights 506 are initially identified by a session leader, but can be expanded upon by the participants to bring new knowledge into the group, with real-time inclusion of data.

As noted above, machine learning algorithms may be used to recommend additional insights, observations, media, supportive data, or users that would be beneficial to the collaboration. The machine learning algorithms leverage industry knowledge, curators, market research data, and participant data. Notably, live board collaboration page 502 provides a shared view such that all participants are viewing the same information and insights 506.

Figure 6:
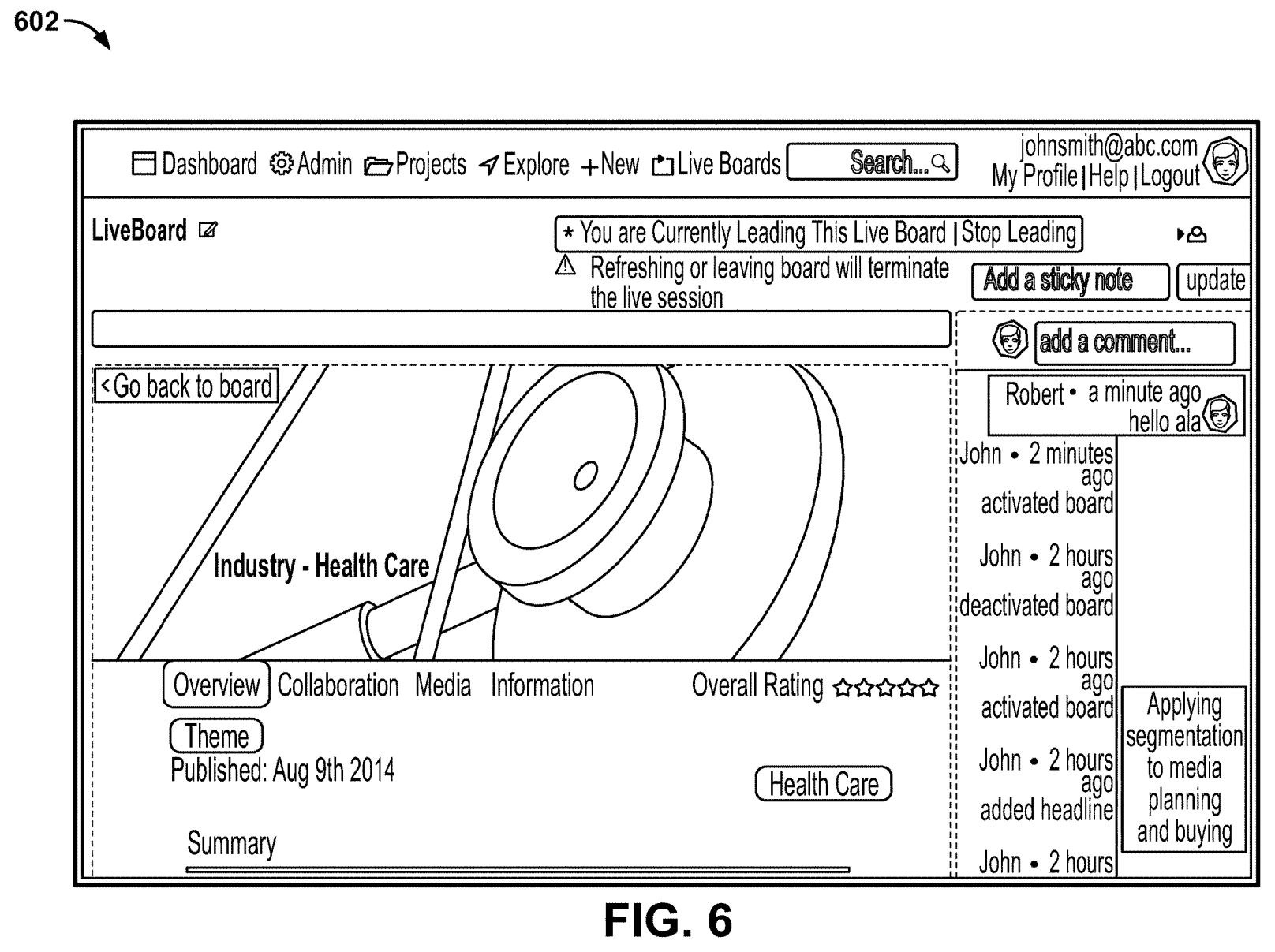

If a participant selects a particular insight 506, computer system 200 generates and displays an insight landing page. FIG. 6 is a screenshot of one embodiment of an insight landing page 602. In insight landing page 602, all participants have the ability to view and comment in real-time on the selected insight as it is being curated. This inspires participants to propose real-time edits to the insight, including inclusion and exclusion of selected data/media. Machine learning algorithms may also be leveraged for insight landing page 602 to provide further knowledge as it pertains to the specific insight at hand, focusing on the specific market and users associated with the selected insight.

Figure 7:
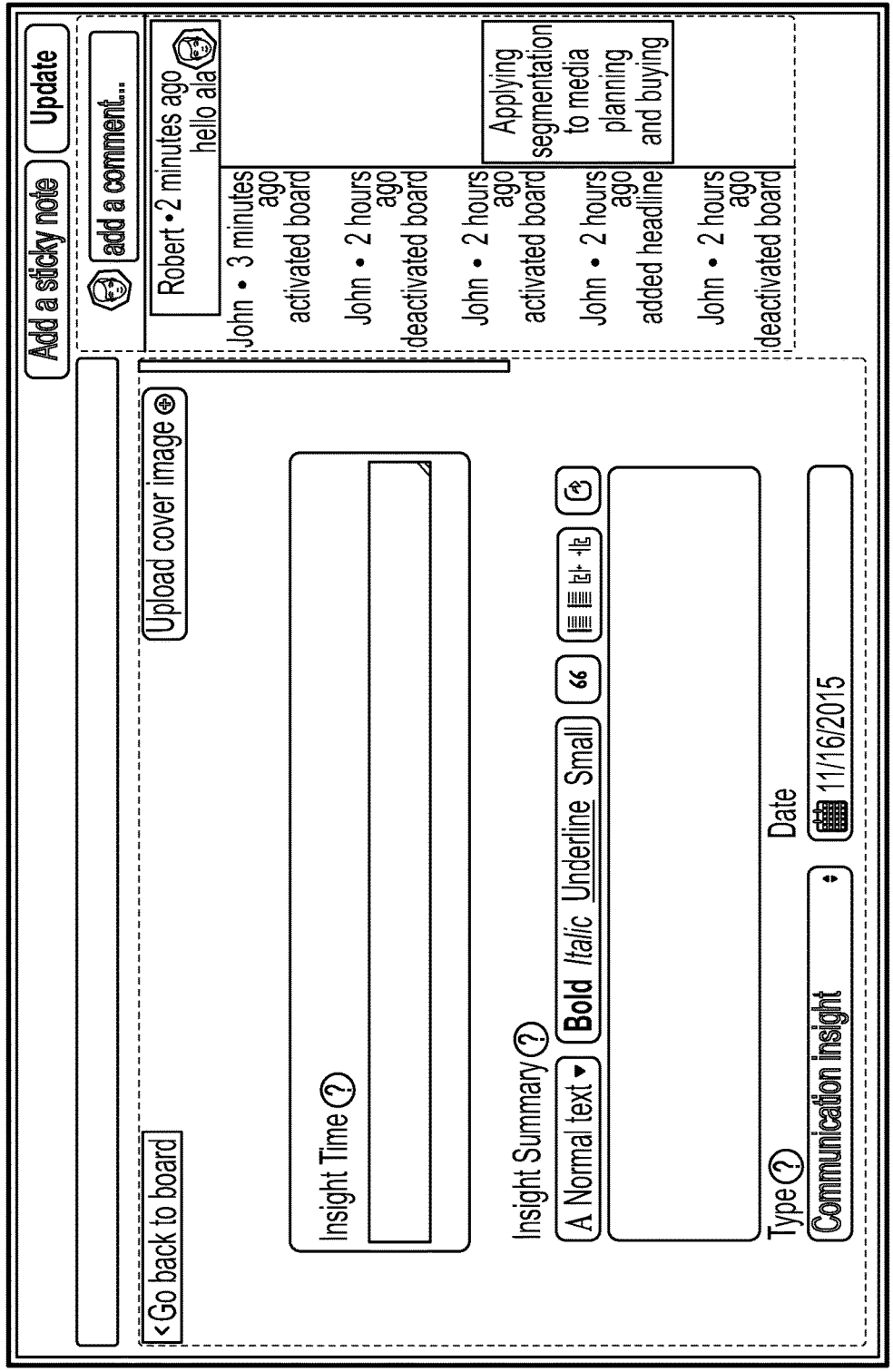
FIG. 7 is a screenshot of one embodiment of an insight edit page that may be generated using the computer system shown in FIG. 1.

FIG. 7 is a screenshot of one embodiment of an insight edit page 702. Insight edit page 702 may be generated and displayed using computer system 200. Using insight edit page 702, collaborators can edit, in real-time, data associated with insights 506. The edits may be made by collaborators directly within their respective browsers and input into the platform for viewing by all participants. Again, machine learning algorithms may be leveraged to recommend various intelligence across tagging, related insights, user input media, etc.

Computer system 200 also facilitates organizing and defining relationships between a plurality of insights. Specifically, in one embodiment, the entire real-time collaborative environment provided by computer system 200 is defined as a graph database, with a unique set of properties. The properties define the data such that insightful and inspirational collaboration can occur. These properties are extensions of market research concepts, and span both qualitative data (e.g., curated insights and observations) and quantitative data (e.g., market research findings, enablers, blockers, etc.). The inclusion of rich media to graph structures allows for novel representations of combined data that were previously unavailable to subject matter experts and industry thought leaders. Accordingly, the generated graph structures provide a new avenue for the generation of market and product insights.

Figure 8:
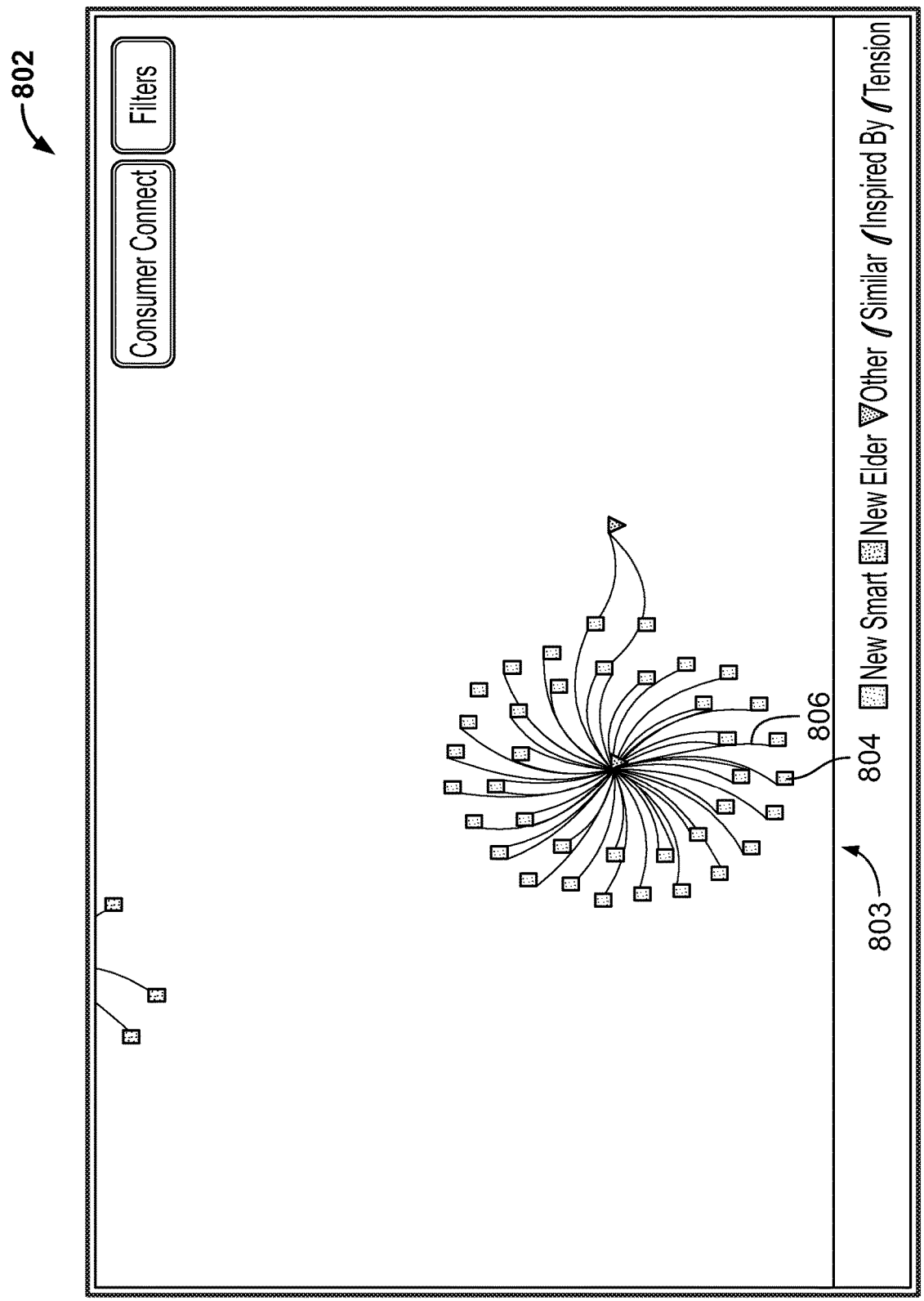
FIG. 8 is a screenshot of one embodiment of a graph structure page that may be generated using the computer system shown in FIG. 1.

FIG. 8 is a screenshot of one embodiment of a graph structure page 802. Graph structure page 802 may be generated and displayed using computer system 200. As shown in FIG. 8, graph structure page 802 displays a graph 803 including plurality of insights 804 and connections 806 between those insights. The implementation of a graph structure allows participants to explore qualitative information using social structures and weights based on graph theory practices that provide performance over the large scale of data.

Again, machine learning algorithms may be implemented for the graph structure. Specifically, machine learning algorithms structured to take advantage of the generated graph 803 continuously scan graph 803 and determine various outputs that include, but are not limited to: i) recommendation of related insights, ii) extraction of tagging from market research data, iii) connectivity of insights to observations, finding and media, without human intervention/curation, iv) curation of user generated content from social media streams (i.e., supportive data to the insights), automatically selected and attached, v) determination of curator behavior, evaluation of breadth and depth of curation, and vi) collaborative group recommendations (e.g., users and data sets).

The machine learning algorithms are developed so as to not consistently exclude or provide bias in their recommendations, given the repeatability of users and curated data across specific market segments. This is important to avoid insight bubbles of users and/or data that would lead to narrowly focused insights. The result is the provision of high quality data to groups of subject matter experts in order to drive qualitative inspiration. That inspiration is visually represented, and provides actionable results across a set of geographically distributed experts.

As described herein, computer system 200 provides an 'always on' platform to store, curate, connect, access, search, visualize, share, and activate insights. The platform enables market research companies and advertising agencies to manage research projects in a unique and efficient manner. Using computer system 200, the platform may be accessible to users as a hosted service available as either a dedicated or shared instance. The choice of dedicated or shared instance may be driven by user needs, volume of transactions, exclusivity, and compliance requirements. For example, the shared model may be more cost-effective, while the dedicated model may be used by larger enterprises.

Computer system 200 also uses an enhanced social graphing and display engine that enables the platform to rapidly map and display insights that have been related together based on social connections generated by researchers. These graphs may be visualized as insight maps that enable users to understand, appreciate, and identify linkages between categories, brands, and consumers across time and across geographies.

The platform provided by computer system 200 focuses on qualitative insights and also incorporates quantitative research as well, covering insights, trends, observations, connections, tags, and related media (which may be collectively referred to as content). Content is derived from results of structured market research conducted by research companies on behalf of clients, as well as content generated by users of computer system 200. In some embodiments, the platform may also facilitate conversations occurring on open social media.

Figure 9:
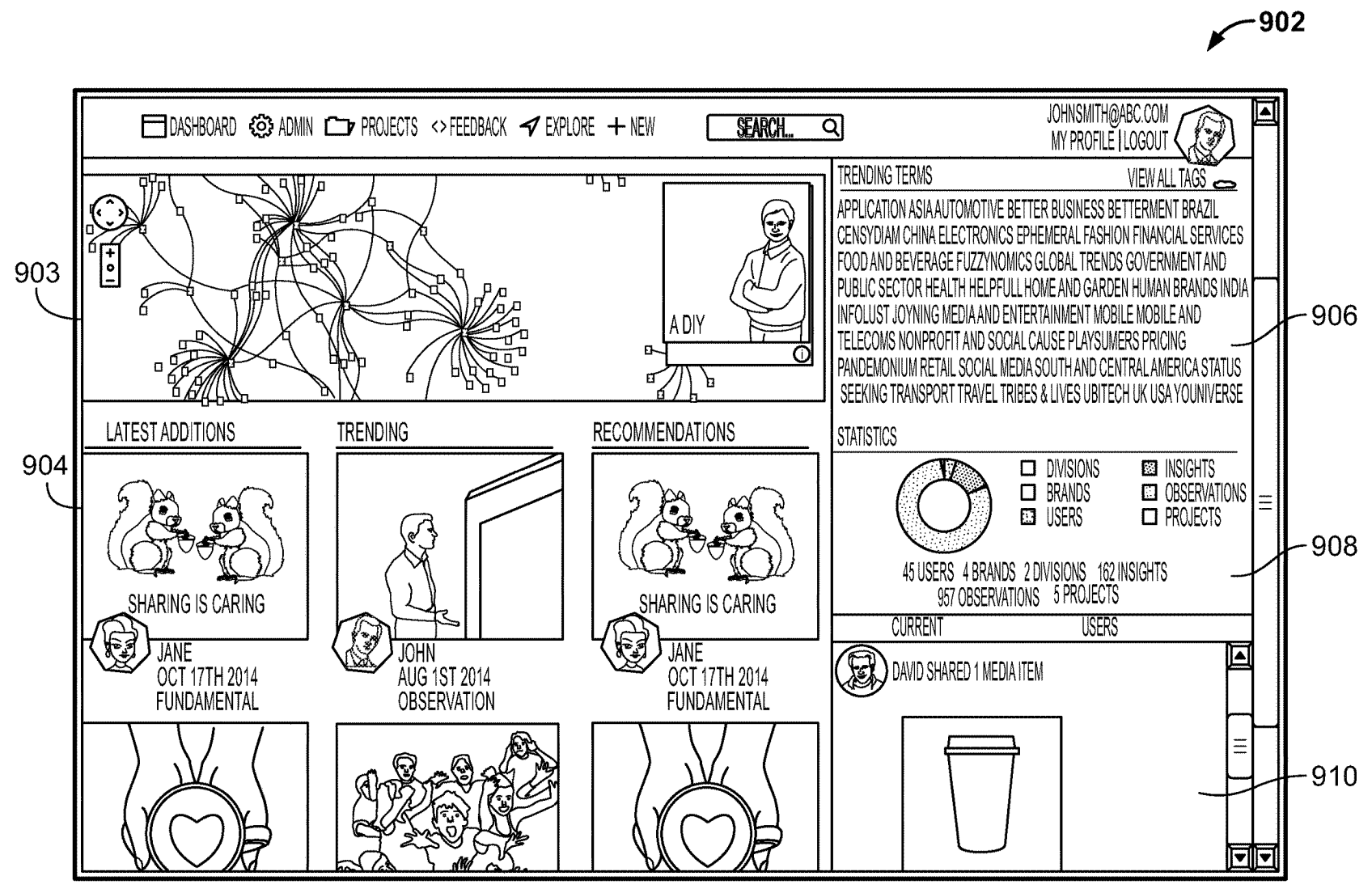

FIG. 9 is a screenshot of one embodiment of a user dashboard page 902. User dashboard page 902 may be generated and displayed using computer system 200. User dashboard page 902 includes a variety of information about market research projects that the user is currently involved in. For example, user dashboard page 902 includes an insight visualization graph 903 that displays relationships between a plurality of insights. User dashboard page 902 also includes a plurality of displayed insights 904 that include trending and recommended insights. Further, a tag cloud 906 displays trending terms, a statistics section 908 displays statistics for the user, and a live wall 910 displays recent collaboration updates.

Figure 10:
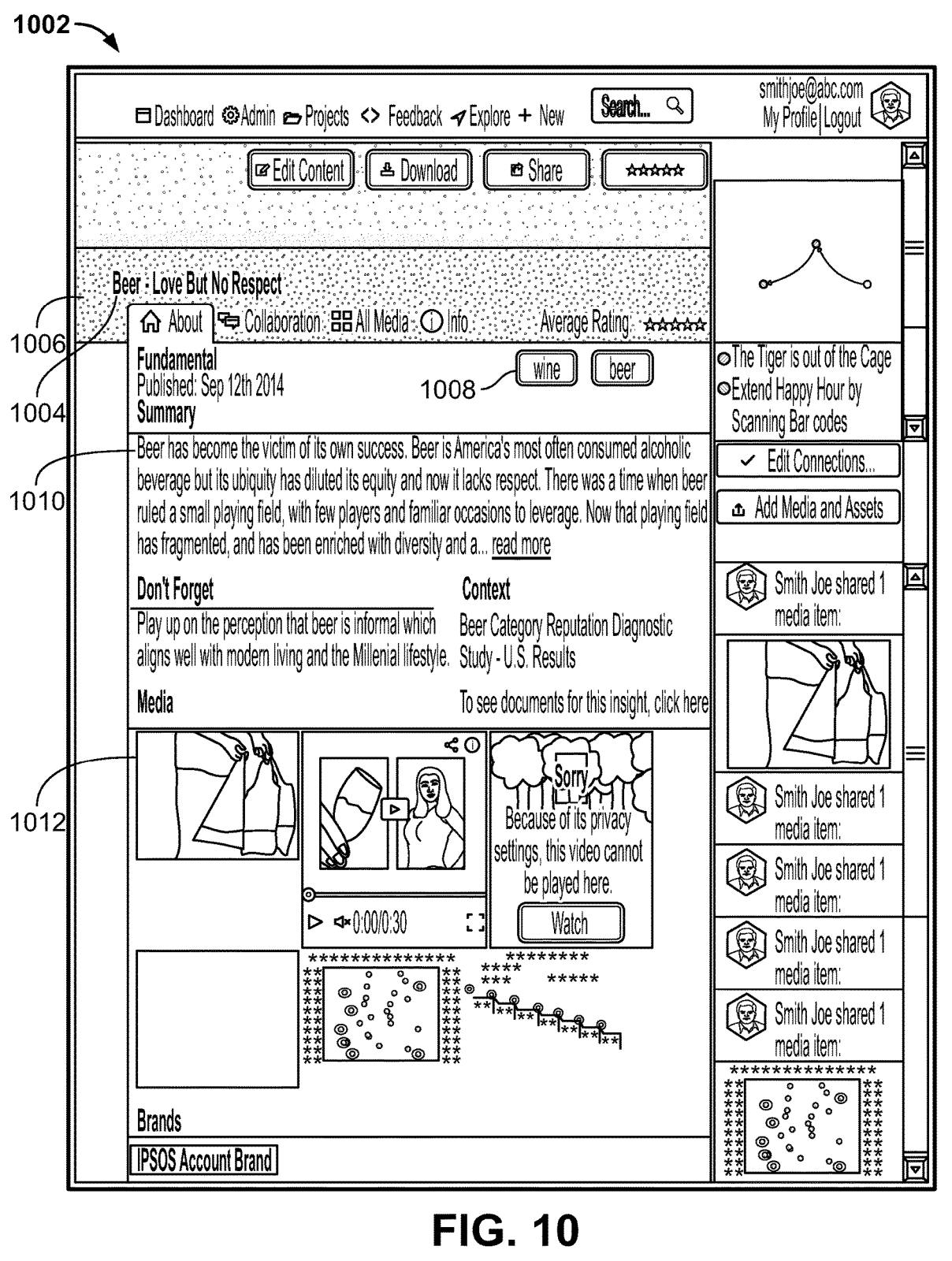

FIG. 10 is a screenshot of one embodiment of an insight page 1002. Insight page 1002 may be generated and displayed using computer system 200. Insight page 1002 includes a headline 1004 and cover image 1006 associated with the insight, one or more tags 1008 associated with the insight, and a summary 1010 of the insight. Insight page 1002 also includes one or more pieces of media 1012 related to the insight. Notably, the information displayed on insight page 1002 can be edited by the user to facilitate collaboration.

Figure 11:
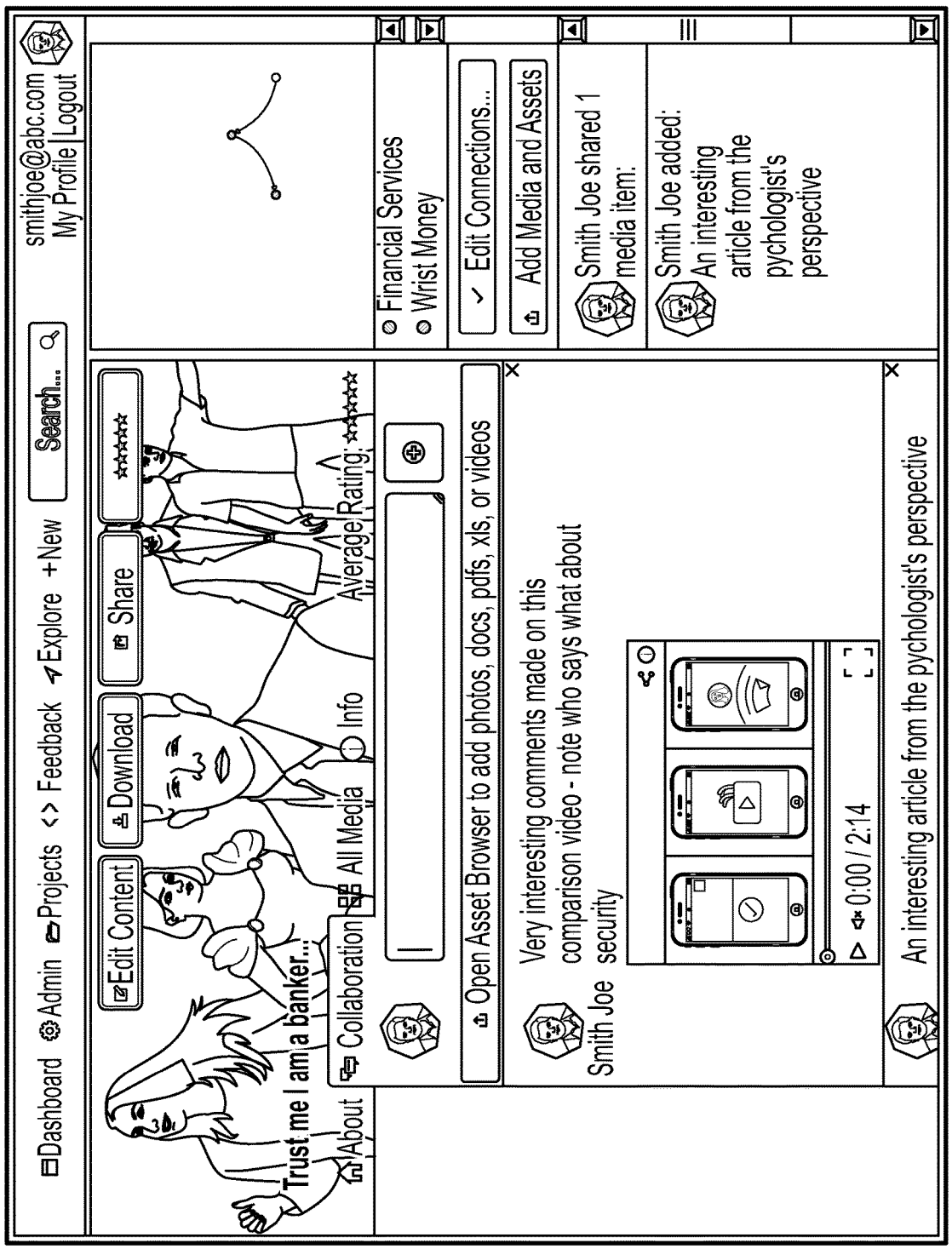
FIG. 11 is a screenshot of one embodiment of a collaboration page that may be generated using the computer system shown in FIG. 1.

FIG. 11 is a screenshot of one embodiment of a collaboration page 1102. Collaboration page 1102 allows a user to download, edit, or share an insight. Further, collaboration page 1102 allows the user to build upon insights, connect other media to the insights, and initiate live sessions with a team of users. The user can also manually connect insights and observations using collaboration page 1102.

Figure 12:
FIG. 12 is a screenshot of one embodiment of a search page that may be generated using the computer system shown in FIG. 1.

A search page 1202, shown in FIG. 12, enables a user to search for relevant insights. Search page 1202 may be generated and displayed using computer system 200. Search terms may be entered in a search bar 1204, and one or more filters 1206 may be used to filter search results.

Figure 13:
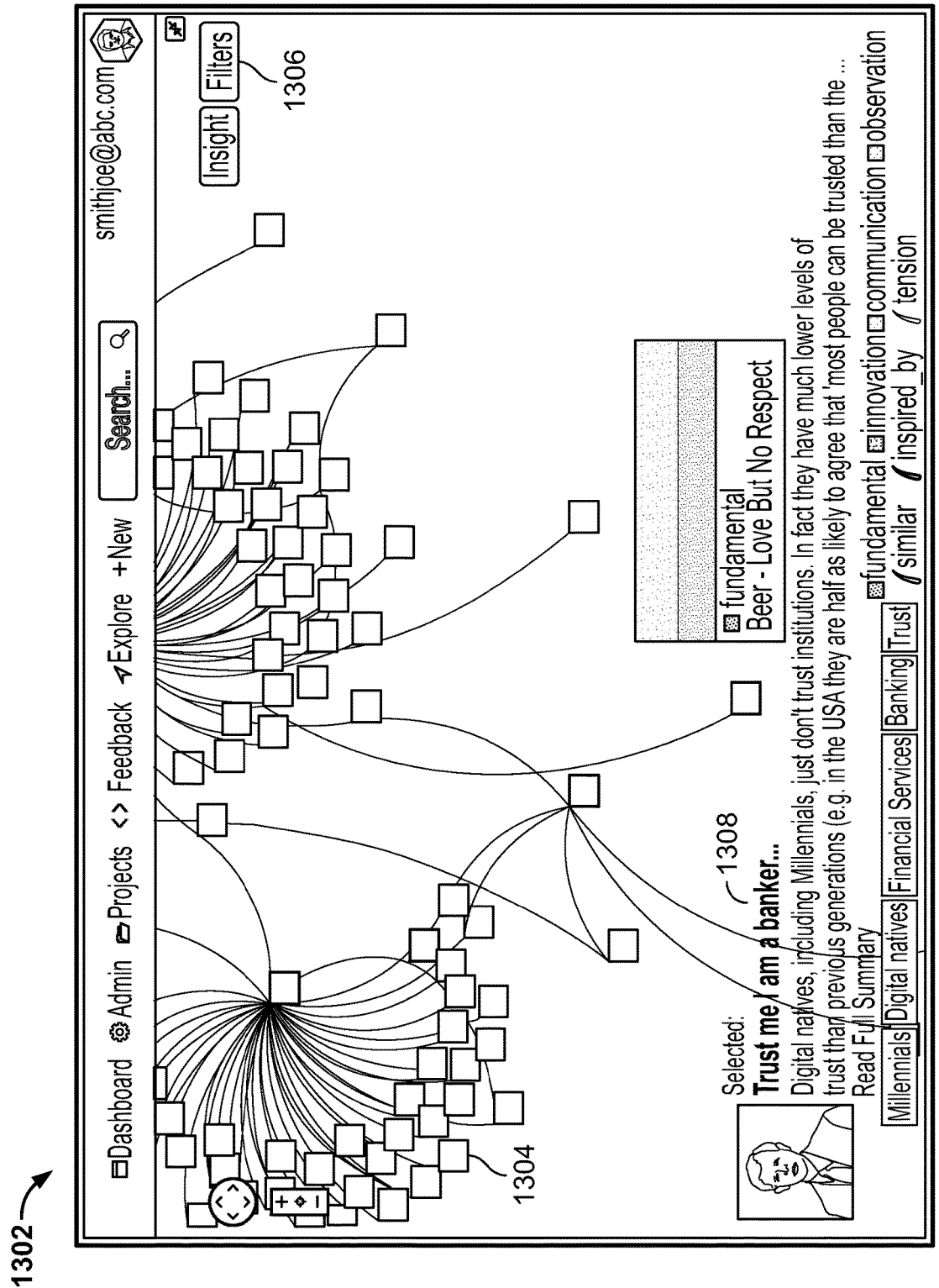
FIG. 13 is a screenshot of one embodiment of a visualization page that may be generated using the computer system shown in FIG. 1.

FIG. 13 is a screenshot of a visualization page 1302 including a graph 1304 displaying connections between multiple insights. Visualization page 1302 may be generated and displayed using computer system 200. Filters 1306 may be used to tailor the insights displayed in graph 1304. Further, a user can scroll in and out to change the zoom level of graph 1304. A quick view 1308 can also be displayed for a selected insight. Notably, visualization page 1302 allows users to discover related insights in an easy, engaging, visual experience.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer implemented method for analyzing market research data, the method comprising:
    displaying, using a market research computing device, a live board to a plurality of users via respective user computing devices, wherein the live board includes a plurality of insights, wherein the live board provides a single visual view that is shared by and simultaneously displayed to all of the plurality of users such that each user computing device displays the same live board at the same point in time, wherein each insight is a targeted qualitative idea or concept that reveals a marketing related tension or aspiration, and wherein the live board includes i) a message window that enables the plurality of users to chat with one another in real-time and ii) a changelog window listing changes made to the live board, the message window and the changelog window displayed simultaneously with and in association with the plurality of insights;
    receiving, at the market research computing device, an input from at least one user of the plurality of users, wherein the input is a selection of a particular insight of the plurality of insights; and
    updating, using the market research computing device, the live board in real-time based on the received input by causing the live board to display an insight landing page associated with the particular insight selected by the at least one user, wherein the input causes the live board to display, at the same point in time on each user computing device, the same insight landing page simultaneously to all of the plurality of users in real-time, wherein the insight landing page displayed simultaneously to all of the plurality of users includes the same message window and the same changelog window included on the previously displayed live board, and wherein the message window and the changelog window are displayed simultaneously with and in association with the particular insight selected by the at least one user.

2. The computer implemented method of claim 1, further comprising receiving a user input for a new insight, and adding the new insight to the live board.

3. The computer implemented method of claim 1, further comprising receiving a user input for an existing insight, and updating the display of the existing insight.

4. The computer implemented method of claim 1, further comprising:
    generating, using machine learning algorithms, a new insight related to the at least one insight; and
    updating the live board to include the new insight.

5. The computer implemented method of claim 1, further comprising:
    generating, using the market research computing device, a graph, the graph including a plurality of insights and connections between the plurality of insights; and
    displaying the generated graph to the plurality of users.

6. The computer implemented method of claim 5, wherein generating a graph comprises generating a graph using machine learning algorithms.

7. The computer implemented method of claim 5, further comprising generating and displaying a user dashboard page for one user of the plurality of users, the user dashboard page including the generated graph, a plurality of insights associated with the user, a tag cloud including trending terms, and a live wall including recent collaboration updates associated with the user.

8. A market research computing device comprising:
    a memory device; and
    a processor communicatively coupled to the memory device, the processor configured to:
        cause a live board to be displayed to a plurality of users via respective user computing devices, wherein the live board includes a plurality of insights, wherein the live board provides a single visual view that is shared by and simultaneously displayed to all of the plurality of users such that each user computing device displays the same live board at the same point in time, wherein each insight is a targeted qualitative idea or concept that reveals a marketing related tension or aspiration, and wherein the live board includes i) a message window that enables the plurality of users to chat with one another in real-time and ii) a changelog window listing changes made to the live board, the message window and the changelog window displayed simultaneously with and in association with the plurality of insights;
        receive an input from at least one user of the plurality of users, wherein the input is a selection of a particular insight of the plurality of insights; and
        update, using the market research computing device, the live board in real-time based on the received input by causing the live board to display an insight landing page associated with the particular insight selected by the at least one user, wherein the input causes the live board to display, at the same point in time on each user computing device, the same insight landing page simultaneously to all of the plurality of users in real-time, wherein the insight landing page displayed simultaneously to all of the plurality of users includes the same message window and the same changelog window included on the previously displayed live board, and wherein the message window and the changelog window are displayed simultaneously with and in association with the particular insight selected by the at least one user.

9. The market research computing device of claim 8, wherein the market research computing device is configured to receive a user input for a new insight, and to add the new insight to the live board.

10. The market research computing device of claim 8, wherein the market research computing device is configured to receive a user input for an existing insight, and to update the display of the existing insight.

11. The market research computing device of claim 8, further configured to:
generate, using machine learning algorithms, a new insight related to the at least one insight; and
update the live board to include the new insight.

12. The market research computing device of claim 8, further configured to:
generate, using the market research computing device, a graph, the graph including a plurality of insights and connections between the plurality of insights; and
display the generated graph to the plurality of users.

13. The market research computing device of claim 12, wherein to generate a graph, the market research computing device is configured to generate a graph using machine learning algorithms.

14. The market research computing device of claim 12, wherein the market research computing device is further configured to generate and display a user dashboard page for one user of the plurality of users, the user dashboard page including the generated graph, a plurality of insights associated with the user, a tag cloud including trending terms, and a live wall including recent collaboration updates associated with the user.

15. A non-transitory computer readable medium that includes computer executable instructions for analyzing market research data, wherein when executed by a market research computing device comprising a processor, the computer executable instructions cause the market research computing device to:
cause a live board to be displayed to a plurality of users via respective user computing devices, wherein the live board includes a plurality of insights, wherein the live board provides a single visual view that is shared by and simultaneously displayed to all of the plurality of users such that each user computing device displays the same live board at the same point in time, wherein each insight is a targeted qualitative idea or concept that reveals a marketing related tension or aspiration, and wherein the live board includes i) a message window that enables the plurality of users to chat with one another in real-time and ii) a changelog window listing changes made to the live board, the message window and the changelog window displayed simultaneously with and in association with the plurality of insights;
receive an input from at least one user of the plurality of users, wherein the input is a selection of a particular insight of the plurality of insights; and
update, using the market research computing device, the live board in real-time based on the received input by causing the live board to display an insight landing page associated with the particular insight selected by the at least one user, wherein the input causes the live board to display, at the same point in time on each user computing device, the same insight landing page simultaneously to all of the plurality of users in real-time, wherein the insight landing page displayed simultaneously to all of the plurality of users includes the same message window and the same changelog window included on the previously displayed live board, and wherein the message window and the changelog window are displayed simultaneously with and in association with the particular insight selected by the at least one user.

16. The non-transitory computer readable medium of claim 15, wherein the computer executable instructions cause the market research computing device to receive a user input for a new insight, and to add the new insight to the live board.

17. The non-transitory computer readable medium of claim 15, wherein the computer executable instructions cause the market research computing device to receive a user input for an existing insight, and to update the display of the existing insight.

18. The non-transitory computer readable medium of claim 15, wherein the computer executable instructions further cause the market research computing device to:
generate, using machine learning algorithms, a new insight related to the at least one insight; and
update the live board to include the new insight.

19. The non-transitory computer readable medium of claim 15, wherein the computer executable instructions further cause the market research computing device to:
generate, using the market research computing device, a graph, the graph including a plurality of insights and connections between the plurality of insights; and
display the generated graph to the plurality of users.

20. The non-transitory computer readable medium of claim 15, wherein to generate a graph, the computer executable instructions cause the market research computing device to generate a graph using machine learning algorithms.

* * * * *